United States Patent
Anantharamaiah et al.

(10) Patent No.: US 7,519,857 B2
(45) Date of Patent: Apr. 14, 2009

(54) METHOD, APPARATUS, AND SYSTEM FOR A SOFTWARE BASED BUSINESS CONTINUITY SOLUTION FOR A COMPUTING ENVIRONMENT

(75) Inventors: Prasanna Anantharamaiah, Karnataka (IN); Raghavendra Hassan Ramachandra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 11/424,551

(22) Filed: Jun. 16, 2006

(65) Prior Publication Data
US 2008/0010481 A1    Jan. 10, 2008

(51) Int. Cl.
*G06F 11/00* (2006.01)

(52) U.S. Cl. .................................... 714/13
(58) Field of Classification Search .............. None
See application file for complete search history.

(56) References Cited

U.S. PATENT DOCUMENTS

| 7,370,228 B2 * | 5/2008 | Takahashi et al. | 714/6 |
| 2002/0133737 A1 * | 9/2002 | Novick | 714/5 |
| 2007/0250738 A1 * | 10/2007 | Phan | 714/6 |

* cited by examiner

*Primary Examiner*—Michael C Maskulinski

(57) ABSTRACT

A heterogeneous and cost effective software based business continuity framework for integrated applications in a computing environment. In one example embodiment, this is accomplished by consolidating application status at each site. The framework then detects and notifies any DR conditions as a function of the consolidated site application status so that either a manual or an automatic system startup and shutdown can then be performed to maintain the business continuity.

19 Claims, 6 Drawing Sheets

METHOD, APPARATUS, AND SYSTEM FOR A SOFTWARE BASED BUSINESS CONTINUITY SOLUTION FOR A COMPUTING ENVIRONMENT

TECHNICAL FIELD OF THE INVENTION

The present invention relates generally to computer systems, and more particularly relates to business continuity and disaster recovery systems.

BACKGROUND OF THE INVENTION

Disaster recovery and/or backup support is commonly provided in computing systems to maintain business continuity. In one environment, a secondary site serves as a backup when the primary site is unavailable for use by customers. Examples of causes for unavailability include disasters, catastrophes, shutting down for maintenance, hardware failure, application failure and so on. Unfortunately, in many situations, the whole primary site is deemed unavailable to customers even if a small portion of resources in that site is unavailable. The secondary site can require almost or even the same resources as the primary site.

Known conventional file transfer methods and systems are based on a manual approach (for example, FTO or email) according to which the user must determine which files need to be transferred in which directions. Some file transfer systems are proprietary and work only with particular hardware combinations and unknown levels of transport security. Most of the conventional techniques are device specific, require significant configuration and are hardware-storage based solutions, which are high-end and expensive. At application level, many of the conventional techniques or architecture frameworks that cannot help detect disaster scenarios and notify appropriately. Further, in integrated systems like operations support systems (OSSs), which typically have geographically distributed applications that are tightly integrated, only customized solutions appear to exist to handle such disaster scenarios. In addition, current hardware implemented techniques can either provide a complete switch over or no switch over in case of a disaster. They do not provide a feature for a partial switch over in case of a disaster as they are based on a single configuration file. Further, the current techniques do not provide switch over in case of planned system outages.

Therefore, there is a need in the art for a cost effective solution that is not hardware-storage based solutions to handle disaster scenarios that minimizes disruptions to end-users in an enterprise IT companies. There is also a need for "System Integrated" subsystems running in a heterogeneous environment (hardware and OS/vendor neutral solution). Furthermore, the subsystem can be a single application or a set of applications running on single/multiple servers. Further, there is also a need for a disaster technique that can work without any limitation on distance between two sites, i.e., distance between primary and secondary. Furthermore, there is also a need to support planned or unplanned (disaster) outage of sub-system to run at a specific location that needs to be detected and restarted at the other location. Moreover, there is also a need for support subsystem level switchover to alternate site, keeping integration between components intact. In addition, there is also a need for the support subsystem disaster recovery to work with minimum functionality and data loss.

SUMMARY OF THE INVENTION

According to an aspect of the subject matter, there is provided a method for business continuity in case of a disaster in a computing environment, comprising the steps of providing a consolidated primary site application status report and a consolidated disaster recovery (DR) site application status report associated with each of one or more applications residing at one or more servers located a primary site and a DR site, respectively, determining a DR condition based on the provided consolidated primary site application status report and the consolidated DR site application status report, and notifying the DR condition as a function of the determination of the DR condition.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "OSS" refers to Operation Support Systems, which includes systems in a communication service provider environment that can perform fault, configuration, accounting, performance, security management, and other such functions. Typically, these management functions and systems are further broadly grouped into three subsystems as service fulfillment, service assurance and service billing. Further, the operational process adopted by service providers requires these subsystems to be fully integrated for efficient operation. The term "disaster" here generally refers to a failure of one or more applications at a primary site. Further, the term "disaster" also refers to a loss of business continuity. The terms "DR site" and "Secondary site" are used interchangeably throughout the document.

Figure 1:
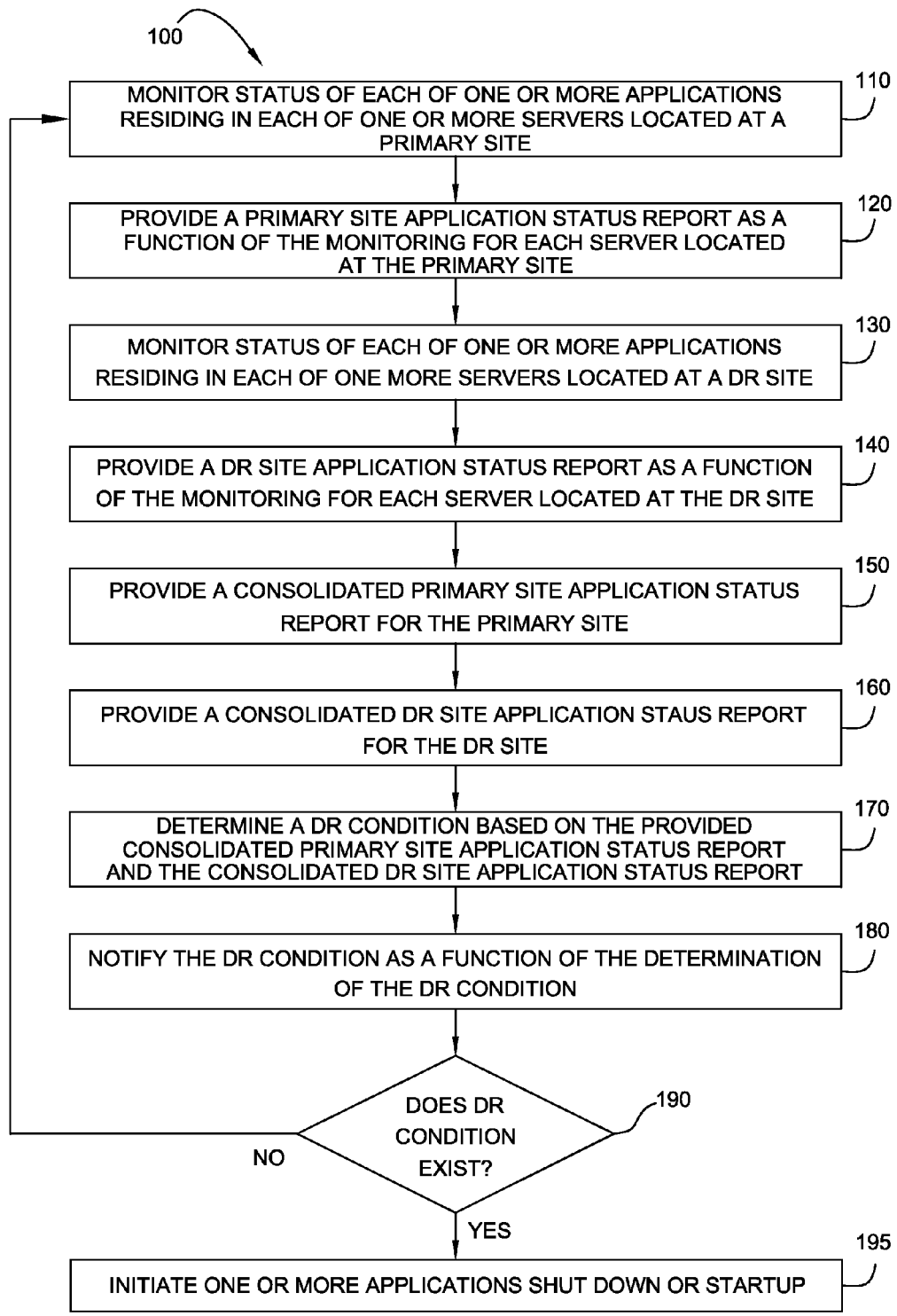
FIG. 1 is a flowchart illustrating a method for providing a software based business continuity solution for a computing environment according to an embodiment of the present subject matter.

FIG. 1 illustrates an example method 100 for providing a software based business continuity solution for a computing environment that is based on synchronizing data and applications residing at a primary site and a secondary site. At step 110, this example method 100 begins by monitoring status of each of one or more applications residing in each of one or more servers located at a primary site. At step 120, a primary site application status report of the one or more applications residing at each of the one or more servers is provided based on the monitoring of the primary site.

Figure 3:
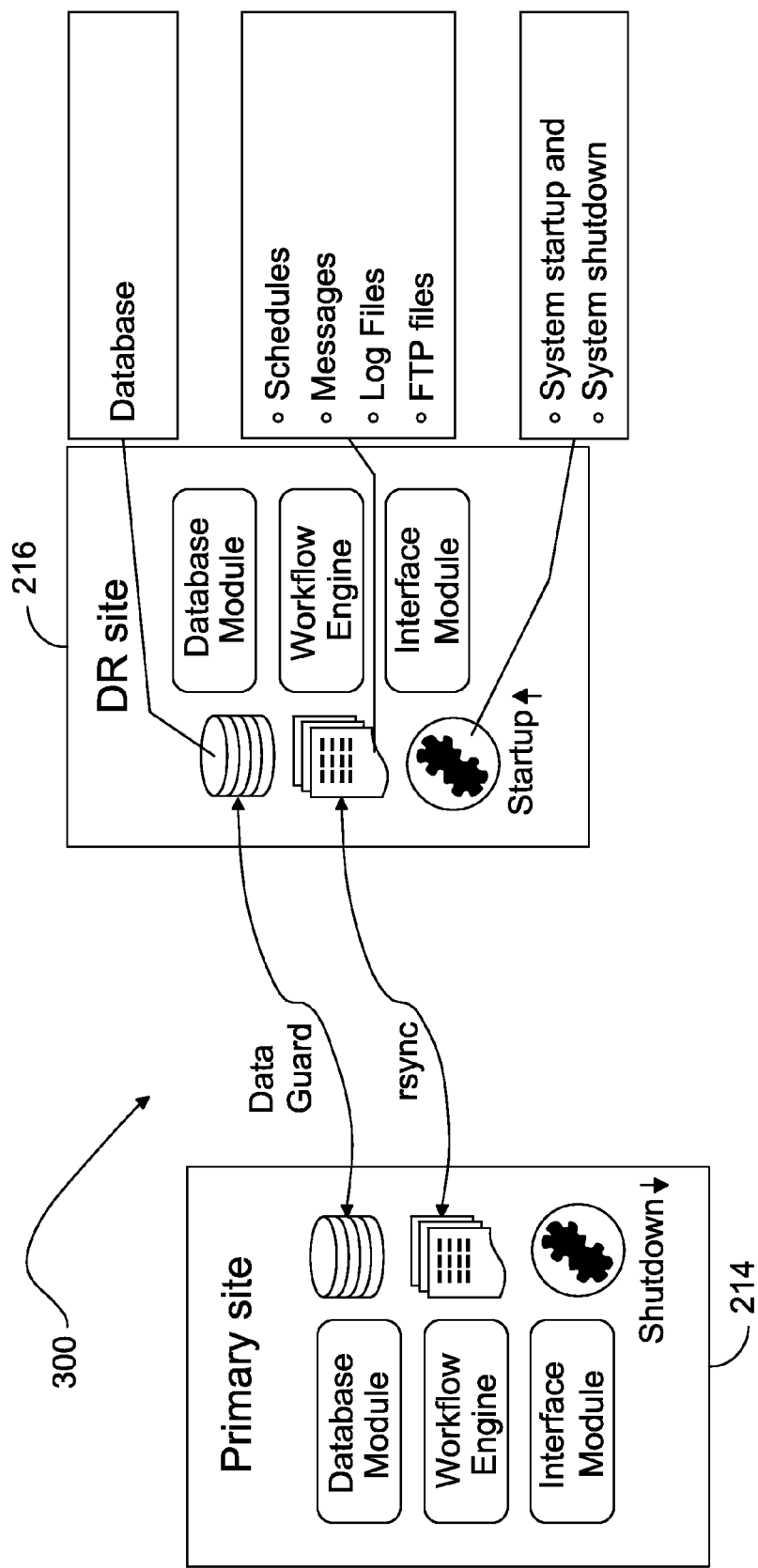
FIG. 3 is a block diagram that illustrates a data synchronization scheme and activation of system shutdown and startup process deployed between the primate site and the DR site according to an embodiment of the invention.

At step 130, status of each of the one or more applications residing in each of the one or more servers located at a DR site is monitored. In some embodiments, the status of the each of the one or more applications residing in each of the one or more servers located at the DR site is monitored using file transfer commands such as ftp and status checking command such as ping as shown in FIG. 3. At step 140, a DR site application status report is provided based on the monitoring of the one or more applications residing at each server at the DR site. In these embodiments, each of the one or more applications located at the primary site and the DR site is an integrated application. The integrated application means, it is a set of applications running on different servers, exchanging information in order to support a defined business and operational process.

In some embodiments, a "DR monitoring cycle time" is determined based on the potential loss of data in the event of a DR condition. In these embodiments, a peak execution time for each component is computed during deployment and the DR monitoring cycle time is determined on the computed peak execution time for each component. In these embodiments, the DR monitoring cycle time is established as low as possible.

At step 150, a consolidated primary site application status report is provided using the provided primary site application status report associated with each application located in each server at the primary site. At step 160, a consolidated DR site application site report is provided using the provided DR site application status report associated with each application located in each server at the DR site.

Figure 4:
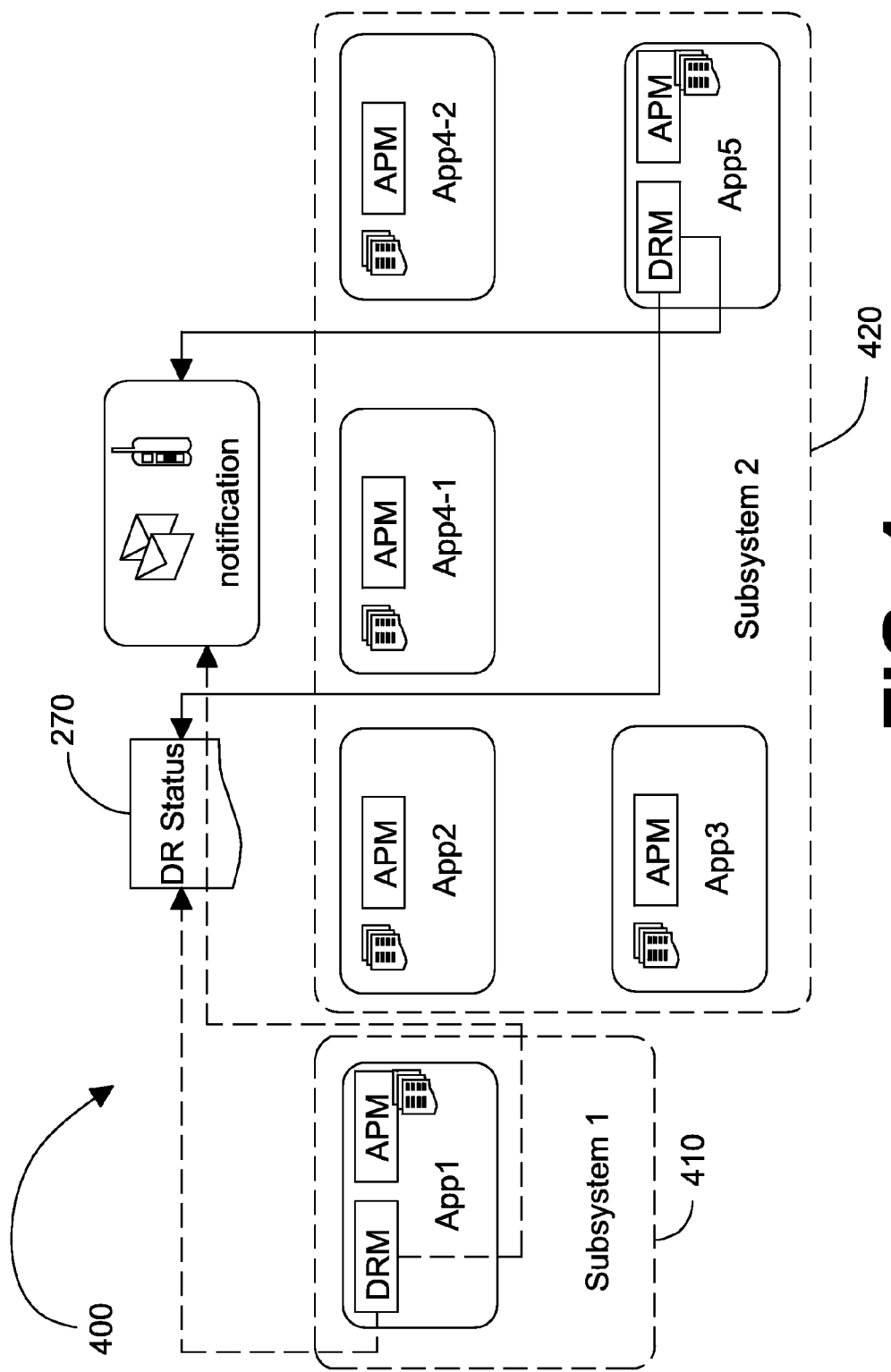
FIG. 4 is a block diagram that illustrates disaster monitoring of integrated applications and initiation of DR notification according to an embodiment of the invention.

At step 170, a DR condition is determined based on the provided consolidated primary site application status report and the consolidated DR site application status report. At step 180, the determined DR condition is notified as shown in FIG. 4.

Figure 5:
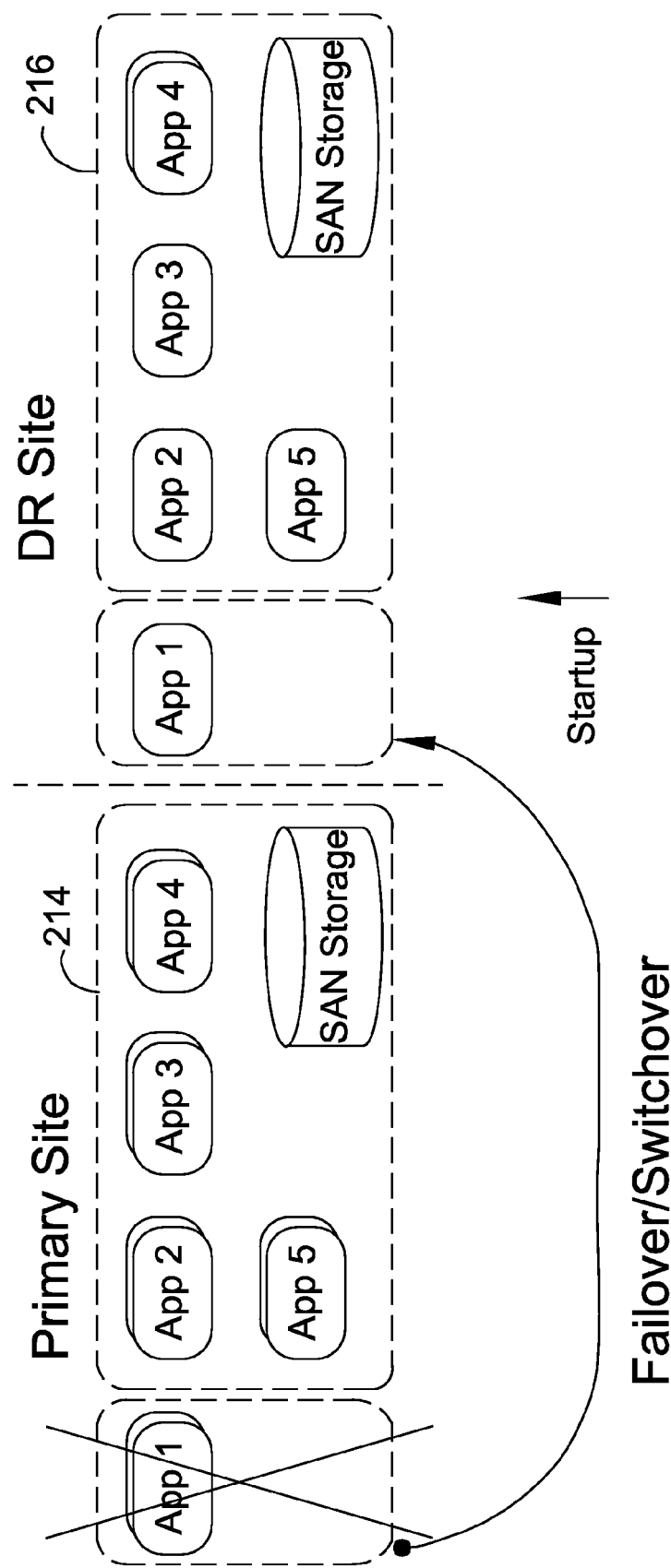
FIG. 5 is a block diagram that illustrates a failover process used during planned and unplanned outages according to an embodiment of the invention.

At step 190, a determination is made as to whether a DR condition exist, based on the notification of the DR condition. The method 100 goes to step 110 and repeats steps 110-195, if the DR condition does not exist based on the determination at step 190. The method 100 goes to step 195 and initiates startup or shut down of one or more applications located at DR site or primary site, respectively, if the DR condition does exist based on the determination at step 190 as shown in FIG. 5. In these embodiments, the method 100 synchronizes each application and associated database located at the primary site with substantially similar application and associated database located at the DR site.

Although the flowchart 100 includes steps 110-195 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
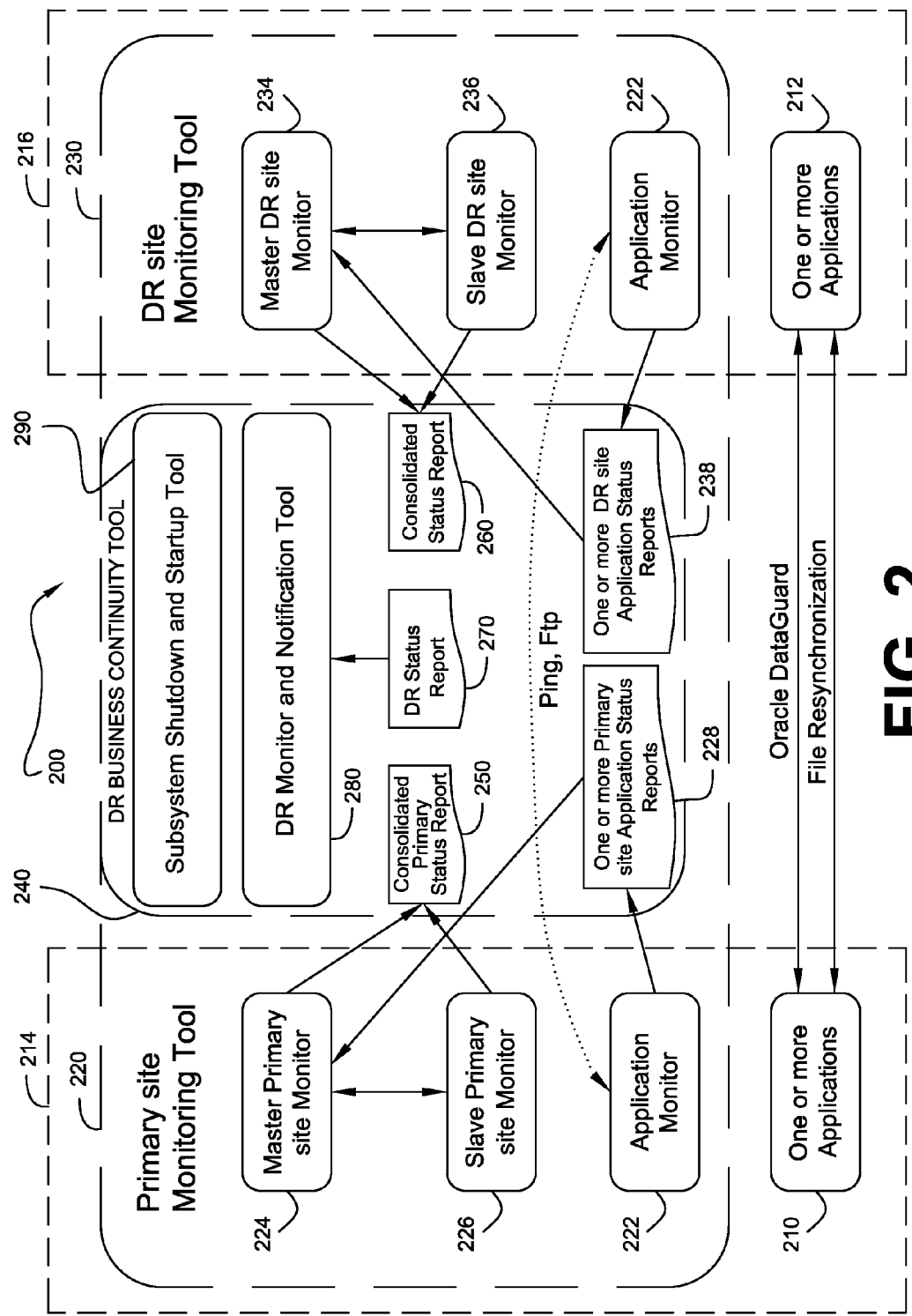
FIG. 2 is a block diagram illustrating an exemplary business continuity framework according to an embodiment of the present subject matter.

Referring now to FIG. 2, there is shown a block diagram that shows an exemplary business continuity framework and/or a disaster recovery framework 200. As shown in FIG. 2, the business continuity framework 200 includes a primary site monitoring tool 220, a DR site monitoring tool 230, and a DR business continuity tool 240. As shown in FIG. 2, the primary site monitoring tool 220 includes a master primary site monitor 224, an associated slave primary site monitor 226, an application monitor 222, and one or more applications 210 residing in one or more servers located at the primary site 214. FIG. 4 shows an exemplary grouping of one or more applications at site 400. As shown in FIG. 4, the one or more applications in the site 400 are grouped such that application 1 resides in a subsystem 1, i.e., in server 1 and the other remaining applications 2-5 reside in a subsystem 2, i.e., in server 2.

Further as shown in FIG. 2, the DR site monitor 230 includes a master DR site monitor 234, an associated slave DR site monitor 236, the application monitor 222, and associated one or more applications 212 residing in one more reports 228 received and one or more DR site application status reports 238 received from the application monitor 222. Moreover, the DR business continuity tool 240 includes a consolidated primary status report 250, a consolidated DR status report 260, and a DR status report 270, a DR monitor and notification tool 280 and a subsystem shutdown and startup tool 290.

In operation, the one or more applications residing in one or more servers at the primary site and the DR site 210 and 212, respectively, are synchronized using file resynchronization tools, such as a standard UNIX based rsync utility that ensures all dynamic files are copied to the DR site regularly at predetermined intervals. Similarly, the data associated with the one or more applications at the primary site 210 are synchronized and copied to the associated data residing at the remote DR site 212 on regular basis using tools, such as Oracle DataGuard.

The application monitor 222 runs both at the primary site and the DR site, 214 and 216, respectively. The application monitor 222 monitors the one or more applications residing both at the primary site and the DR site, 214 and 216, respectively, using standard status checking commands, such as ping. Further, the application monitor 222 maintains the one or more primary site application status reports 228 and the one or more DR site application status reports 238 as a function of the monitoring both at the primary site and the DR site, 214 and 216, respectively, using standard file transfer commands, such as ftp.

In some embodiments, the master primary site monitor 224 and the slave primary site monitor 226 reside and run on two separate servers located at the primary site 214. Similarly, the master DR site monitor 234 and the slave DR site monitor 236 reside and run on two separate servers located at the DR site 216. In these embodiments, the slave monitor monitors the master monitor and takes over the monitoring function if the master goes down/fails for any reason. Also in these embodiments, the master primary site monitor 224 and the master DR site monitor 234 consolidates the one or more primary site application status reports and the one or more DR site application status reports and outputs a consolidated primary status report 250 and the consolidated DR status report 260, respectively.

The DR monitor and notification tool 280 runs both at the primary site 214 and the DR site 216 and analyzes the consolidate primary status report 250 and the consolidated DR status report 260 and forms and maintains a DR status report 270. The subsystem shutdown and startup tool 290 then ensures that the one or more applications residing at the primary site 214 and the DR site 216 is shutdown and started by appropriately reconfiguring the applications for data replication as a function of the DR status report 270. An exemplary shutdown of application 1 at the primary site 214 and startup of an associated application 1 at the DR site 216 is shown in FIG. 5 as a function of the monitoring of the DR status report. As shown in FIG. 5, the shutdown of one or more applications at the primary site 214 and start up of substantially similar one or more applications at the DR site 216 can occur due to failover/switchover (failover can occur due to an unplanned disaster and switchover can occur due to a planned outage of an application).

The operation of the business continuity framework 200 in a computing environment is explained in more detail with reference to FIG. 1.

Various embodiments of the present subject matter can be implemented in software, which may be run in the environment shown in FIG. 6 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 6:
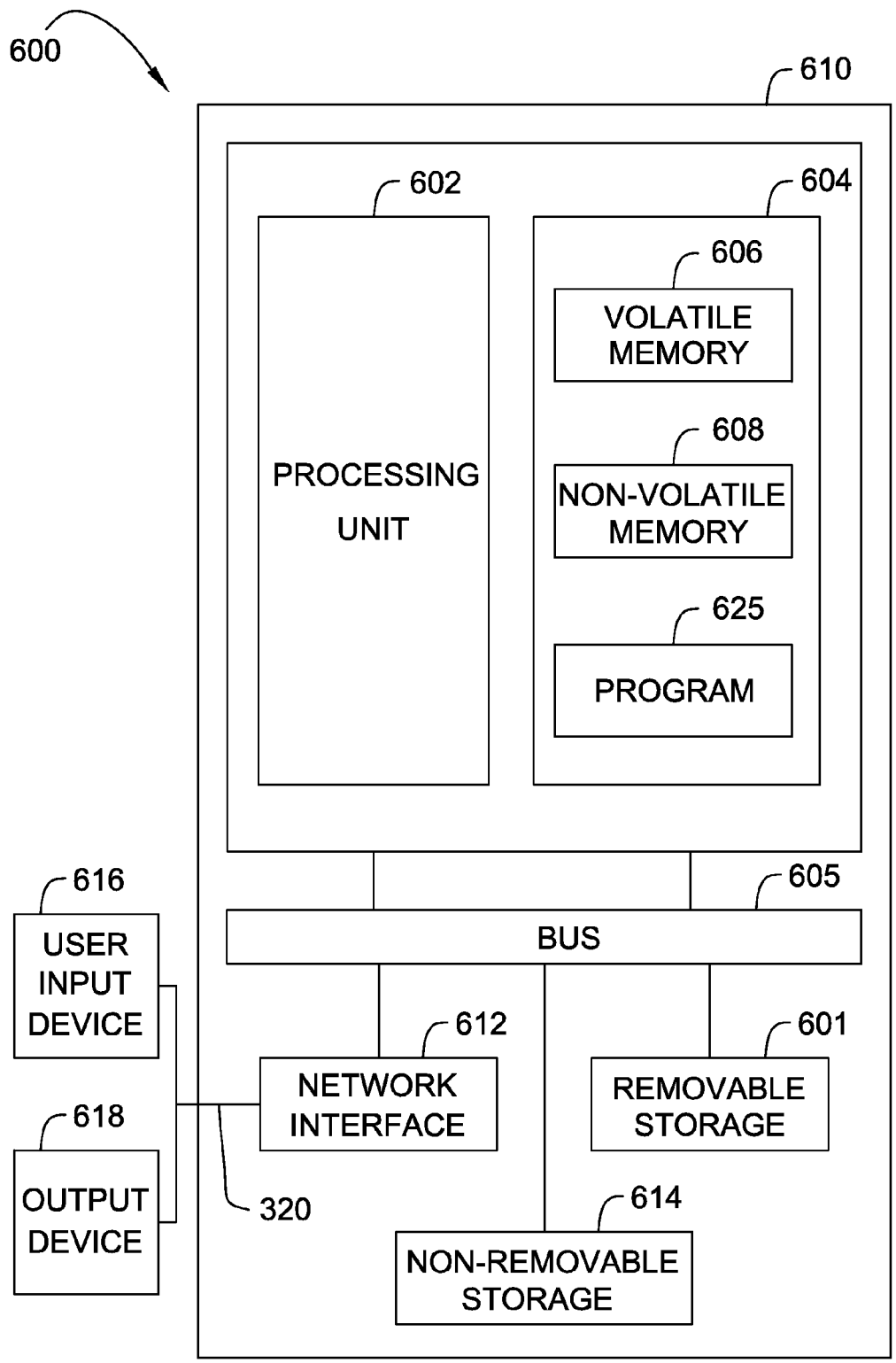
FIG. 6 is a block diagram of a typical computer system used for implementing embodiments of the present subject matter shown in FIGS. 1-2.

FIG. 6 shows an example of a suitable computing system environment for implementing embodiments of the present subject matter. FIG. 6 and the following discussion are intended to provide a brief, general description of a suitable computing environment in which certain embodiments of the inventive concepts contained herein may be implemented.

A general computing device, in the form of a computer 610, may include a processor 602, memory 604, removable storage 601, and non-removable storage 614. Computer 610 additionally includes a bus 605 and a network interface 612.

Computer 610 may include or have access to a computing environment that includes one or more user input modules 616, one or more output modules 618, and one or more communication connections 620 such as a network interface card or a USB connection. The one or more output devices 618 can be a display device of computer, computer monitor, TV screen, plasma display, LCD display, display on a digitizer, display on an electronic tablet, and the like. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 604 may include volatile memory 606 and non-volatile memory 608. A variety of computer-readable media may be stored in and accessed from the memory elements of computer 610, such as volatile memory 606 and non-volatile memory 608, removable storage 601 and non-removable storage 614. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 602 of the computer 610. For example, a program module 625 may include machine-readable instructions capable of providing a software based business continuity solution for a computing environment including integrated applications according to the teachings and herein described embodiments of the present subject matter. In one embodiment, the program module 625 may be included on a CD-ROM and loaded from the CD-ROM to a hard drive in non-volatile memory 608. The machine-readable instructions cause the computer 610 to encode according to the various embodiments of the present subject matter.

The operation of the computer system 600 for providing the software based business continuity/disaster recovery solution is explained in more detail with reference to FIG. 1. The above-described framework provides a solution for an individual application to be disaster recoverable to maintain business continuity. Further, the above-described process provides a device-neutral heterogeneous disaster recoverable solution. Furthermore, it is a simple cost-effective solution that is based on existing implementation tools, such as perl, Oracle Data Guard, rsync, and so on to synchronize files and databases between sites. In addition, the above described process uses existing status and file transfer commands, such as ftp and ping, respectively, to monitor the status of the applications between the two sites. Also, the above solution does not require any additional hardware components. In addition, the above-described technique provides a disaster recovery with minimum data loss. The above process provides a business continuity using a simple implementation and administration scheme. Moreover, the above technique supports both planned and unplanned outage. The above technique can be especially useful to situations where the distance between the primary site and the DR site does not allow implementation of a simple and cost effective, shared disk (SCSI disk) based two-node cluster solution due to limitations in communications links, such as a LAN based shared disk which requires a hot switchover in case of a disaster.

Although, the above example embodiments shown in FIGS. 1-6 are explained with reference to a computing environment including integrated operations support systems for telecom operations, the above-described technique is not limited to only these applications, but it can be used within any networked computing environment where business continuity and disaster recovery is desired. Although the embodiments of the present invention are described in the context of non-distributed environment they can be very much implemented in the distributed environment as well.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-6 are merely representational and are not drawn to scale. Certain proportions thereof may be exaggerated, while others may be minimized. FIGS. 1-6 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method of providing a vendor-neutral business continuity computing environment, comprising:
   providing a consolidated primary site application status report and a consolidated disaster recovery (DR) site application status report associated with each of one or more applications residing at one or more servers located a primary site and a DR site, respectively;
   determining a DR condition based on the provided consolidated primary site application status report and the consolidated DR site application status report; and
   notifying the DR condition as a function of the determination of the DR condition,
   wherein providing the consolidated primary site application status report and the consolidated DR site application status report comprises:
   providing a primary site application status report for each of one or more applications residing in each of one or more servers at the primary site;
   providing the consolidated primary site application status report for the primary site using the primary site application status report associated with each of the one or more servers located at the primary site;
   providing a DR site application status report for each one of substantially similar one or more applications residing in each of one or more servers at the DR site; and
   providing the consolidated DR site application status report for the DR site using the DR site application status report associated with each of the one or more servers located at the DR site.

2. The method of claim 1, further comprising:
   implementing a manual system startup and shutdown upon notification of the DR condition.

3. The method of claim 1, further comprising:
   automatically initiating a system startup and shutdown upon notification of the DR condition.

4. The method of claim 1, wherein providing the primary site application status report comprises:
   monitoring status of each of the one or more applications residing in each of the one or more servers located in the primary site; and
   providing the primary site application status report of the one or more applications residing in each of one or more servers at the primary site as a function of the monitoring at the primary site.

5. The method of claim 1, wherein providing the DR site application status report comprises:
   monitoring status of each of the one or more applications residing in each of the one or more servers located in the DR site using status checking and file transfer commands selected from the group consisting of ping and ftp; and
   providing the DR site application status report associated with the substantially similar one or more applications residing in each of one or more servers at the DR site as a function of the monitoring at the DR site.

6. The method of claim 1, wherein, in providing the primary site application status report and the DR site application status report, each of the one or more applications is an integrated application.

7. The method of claim 1, further comprising:
   synchronizing each application and its associated database located at the primary site with each substantially similar application and its associated database located at the DR site.

8. The method of claim 1, further comprising:
   determining whether a DR condition exists based on the notification;
   if so, then shutting down or starting up one or more applications at the primary site or the DR site as a function of the DR condition notification; and
   if not, then repeating the steps of providing, determining, and notifying.

9. A method for providing a heterogeneous computing environment for providing business continuity in the event of a disaster, comprising:

provphilippine a primary site application status report associated with one or more integrated applications residing in each of one or more servers at a primary site by a primary application monitor;

providing a consolidated primary site application status report using the primary site application status report associated with each of the one or more servers located at the primary site by a master primary monitor;

providing a DR site application status report associated with substantially similar one or more integrated applications residing in each of one or more servers at a DR site by a DR application monitor; and providing a consolidated DR site application status report using the DR site application status report associated with each of the one or more servers located at the DR site by a master DR monitor;

determining a DR condition based on the provided consolidated primary site application status report and the consolidated DR site application status report by a DR monitor and a notifier; and notifying the DR condition as a function of the determination of the DR condition by the DR monitor and the notifier.

10. The method of claim 9, further comprising:

monitoring working of the master primary monitor by a slave primary monitor; and taking over the determining and notifying steps by the slave primary monitor based on the monitoring of the master primary monitor.

11. The method of claim 9, further comprising:

monitoring working of the master DR monitor by a slave DR monitor; and taking over the determining and notifying steps by the slave DR monitor based on the monitoring of the master DR monitor.

12. The method of claim 9, further comprising:

synchronizing each of the one or more applications located at the primary site with each of the substantially similar one or more applications located at the DR site; and synchronizing databases associated with each of the one or more applications located at the primary site with each of the substantially similar databases associated with one or more applications located at the DR site.

13. The method of claim 12, wherein, in synchronizing the one or more applications and the associated databases located at the primary site and the DR site, each application is disaster recoverable using status and file transfer commands selected from the group consisting of ping and ftp.

14. An article comprising:

a storage medium having instructions that, when executed by a computing platform, result in execution of a method for providing a device neutral business continuity solution in a computing environment comprising:

providing a consolidated primary site application status report and a consolidated disaster recovery (DR) site application status report associated with each of one or more applications residing at one or more servers located a primary site and a DR site, respectively;

determining a DR condition based pn the provided consolidated primary site application status report and the consolidated DR site application status report; and notifying the DR condition as a function of the determination of the DR conditions wherein providing the consolidated primary site application status report and the consolidated DR site application status report comprises:

providing a primary site application status report for each of one or more applications residing in each of one or more servers at the primary site;

providing the consolidated primary site application status report for the primary site using the primary site application status report associated with each of the one or more servers located at the primary site;

providing a DR site application status report for each one of substantially similar one or more applications residing in each of one or more servers at the DR site; and providing the consolidated DR site application status report for the DR site using the DR site application status report associated with each of the one or more servers located at the DR site.

15. A computer system comprising:

a computer network, wherein the computer network has a plurality of network elements, and wherein the plurality of network elements has a plurality of network interfaces;

a network interface;

an input module coupled to the network interface that receives topology data via the network interface;

a processing unit; and a memory coupled to the processor, the memory having stored therein code associated with providing a heterogeneous computing environment for providing business continuity in the event of a disaster, comprising:

providing a primary site application status report associated with one or more integrated applications residing in each of one or more servers at a primary site by a primary application monitor;

providing a consolidated primary site application status report using the primary site application status report associated with each of the one or more servers located at the primary site by a master primary monitor;

providing a DR site application status report associated with substantially similar one or more integrated applications residing in each of one or more servers at a DR site by a DR application monitor; and providing a consolidated DR site application status report using the DR site application status report associated with each of the one or more servers located at the DR site by a master DR monitor;

determining a DR condition based on the provided consolidated primary site application status report and the consolidated DR site application status monitor and a notifier; and notifying the DR condition as a function of the determination of the DR condition by the DR monitor and the notifier.

16. The system of claim 15, further comprising:

monitoring working of the master primary monitor by a slave primary monitor; and taking over the determining and notifying steps by the slave primary monitor based on the monitoring of the master primary monitor.

17. The system of claim 16, further comprising:

monitoring working of the master DR monitor by a slave DR monitor; and taking over the determining and notifying steps by the slave DR monitor based on the monitoring of the master DR monitor.

18. The system of claim 16, further comprising:
synchronizing each of the one or more applications located at the primary site with each of the substantially similar one or more applications located at the DR site; and
synchronizing databases associated with each of the one or more applications located at the primary site with each of the substantially similar databases associated with one or more applications located at the DR site.

19. The system of claim 18, wherein, in synchronizing the one or more applications and the associated databases located at the primary site and the DR site, each application is disaster recoverable using status and file transfer commands selected from the group consisting of ping and ftp.

* * * * *

UNITED STATES PATENT AND TRADEMARK OFFICE
CERTIFICATE OF CORRECTION

PATENT NO. : 7,519,857 B2
APPLICATION NO. : 11/424551
DATED : April 14, 2009
INVENTOR(S) : Prasanna Anantharamaiah et al.

It is certified that error appears in the above-identified patent and that said Letters Patent is hereby corrected as shown below:

In column 9, line 63, in Claim 14, delete "pn" and insert -- on --, therefor.

In column 9, line 67, in Claim 14, delete "conditions" and insert -- condition, --, therefor.

In column 10, line 51, in Claim 15, after "status" insert -- report by a DR --.

Signed and Sealed this

Twenty-ninth Day of June, 2010

David J. Kappos
*Director of the United States Patent and Trademark Office*